US011314600B2

(12) United States Patent
Prasad et al.

(10) Patent No.: US 11,314,600 B2
(45) Date of Patent: Apr. 26, 2022

(54) DATA PLACEMENT METHOD BASED ON HEALTH SCORES

(71) Applicant: EMC IP Holding Company LLC, Hopkinton, MA (US)

(72) Inventors: Parmeshwr Prasad, Bangalore (IN); Bing Liu, Tianjin (CN); Rahul Deo Vishwakarma, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 231 days.

(21) Appl. No.: 16/887,666

(22) Filed: May 29, 2020

(65) Prior Publication Data

US 2021/0374013 A1 Dec. 2, 2021

(51) Int. Cl.
*G06F 12/00* (2006.01)
*G06F 11/14* (2006.01)
*G06K 9/62* (2022.01)
*G06N 20/00* (2019.01)

(52) U.S. Cl.
CPC ...... *G06F 11/1461* (2013.01); *G06F 11/1451* (2013.01); *G06F 11/1464* (2013.01); *G06F 11/1469* (2013.01); *G06K 9/6276* (2013.01); *G06N 20/00* (2019.01)

(58) Field of Classification Search
CPC ............ G06F 11/1461; G06F 11/1451; G06F 11/1464; G06F 11/1469; G06N 20/00; G06K 9/6276
See application file for complete search history.

(56) References Cited

U.S. PATENT DOCUMENTS 10,089,144 B1* 10/2018 Nagpal ................. G06F 9/5027
2019/0278661 A1* 9/2019 Mehta ..................... G06F 3/061

* cited by examiner

*Primary Examiner* — Gurtej Bansal
(74) *Attorney, Agent, or Firm* — Chamberlain, Hrdlicka, White, Williams & Aughtry (57) ABSTRACT

Embodiments described herein relate to techniques for placing backup data based on health scores. The techniques may include: obtaining data items associated with a first data domain restorer; obtaining data items associated with a second data domain restorer; making a prediction that the first data domain restorer is operating normally; making a prediction that the second data domain restorer is operating normally; assigning a confidence value to the first prediction; making a classification of the first data domain restorer in a first group based on the confidence value; assigning a confidence value to the second prediction; making a classification of the second data domain restorer in a second group based on the confidence value; and performing a data backup to the first data domain restorer from a first computing device based on the classification and a first service level required for the first computing device.

20 Claims, 6 Drawing Sheets

DATA PLACEMENT METHOD BASED ON HEALTH SCORES

BACKGROUND

Computing devices often store data on one or more storage devices included in and/or operatively connected to the computing device. Such data may be backed up to other computer storage located, for example, separately from the computing devices to create redundant copies of the data. Such copies may; for example, be used to restore data from the backup copies in the event of a problem with the computing device from which the data was backed up.

SUMMARY

In general, embodiments described herein relate to a method for placing backup data based on health scores. The method may include: obtaining a first plurality of data items associated with a first data domain restorer; obtaining a second plurality of data items associated with a second data domain restorer; making a first prediction that the first data domain restorer is operating normally; making a second prediction that the second data domain restorer is operating normally; assigning a first confidence value to the first prediction; making a first classification of the first data domain restorer in a first group based on the first confidence value; assigning a second confidence value to the second prediction; making a second classification of the second data domain restorer in a second group based on the second confidence value; and performing a first data backup to the first data domain restorer from a first computing device based on the first classification and a first service level required for the first computing device.

In general, embodiments described herein relate to a non-transitory computer readable medium including computer readable program code, which when executed by a computer processor enables the computer processor to perform a method for placing backup data based on health scores. The method may include: obtaining a first plurality of data items associated with a first data domain restorer; obtaining a second plurality of data items associated with a second data domain restorer; making a first prediction that the first data domain restorer is operating normally; making a second prediction that the second data domain restorer is operating normally; assigning a first confidence value to the first prediction; making a first classification of the first data domain restorer in a first group based on the first confidence value; assigning a second confidence value to the second prediction; making a second classification of the second data domain restorer in a second group based on the second confidence value; and performing a first data backup to the first data domain restorer from a first computing device based on the first classification and a first service level required for the first computing device.

In general, embodiments described herein relate to a system for placing backup data based on health scores. The system may include: a first data domain restorer including a first processor, first memory, and a first persistent storage device; a second data domain restorer including a second processor, second memory, and a second persistent storage device; and a data placement controller comprising a third processor, third memory, and a third persistent storage device. The data placement controller may be configured to: obtain a first plurality of data items associated with the first data domain restorer; obtain a second plurality of data items associated with the second data domain restorer; make a first prediction that the first data domain restorer is operating normally; make a second prediction that the second data domain restorer is operating normally; assign a first confidence value to the first prediction; make a first classification of the first data domain restorer in a first group based on the first confidence value; assign a second confidence value to the second prediction; make a second classification of the second data domain restorer in a second group based on the second confidence value; and perform a first data backup to the first data domain restorer from a first computing device based on the first classification and a first service level required for the first computing device.

Other aspects of the embodiments disclosed herein be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for placing backup data based on health scores. In one or more embodiments, data domain restorers, and/or backup storage devices operatively connected thereto, may include a variety of hardware components and/or software components (e.g., processors, memory, hard disk drives (HDDs), solid state drives (SSDs), Storage Class Memory (SCM), networking components (e.g., network cards), batteries, processors, memory components, operating systems, etc.). Data items associated with such components may indicate the relative health of the data domain restorer that includes the components.

In one or more embodiments, data items associated with a set of data domain restorers are obtained. In one or more embodiments, the data items indicate whether a given data domain restorer is failed or normal. In one or more embodiments, a failed state indicates that using the data domain restorer for backing up data from computing devices may result in data loss and/or data corruption. In one or more embodiments, a normal state indicates that the data domain restorer is healthy enough to store backup data from computing devices without data loss and/or data corruption.

In one or more embodiments, failed data domain restorers are discarded from a set of data domain restorers that are classified as normal. A data domain administrator may be informed of such failed devices, and may or may not take actions to repair the failed devices. In one or more embodiments, the set of data domain restorers classified as normal may be ranked according to a confidence prediction in the normal classification, and placed into groups based on a defined set of thresholds. In one or more embodiments, the thresholds are related to service levels to be provided to users of computing devices from which the data to be backed up originates. For example, a first service level classification of computing device users military and financial services entities) may require that data domain restorers be available for data backup and/or data restoration at least 70% of the time. A second group of computing device users may only require weekly or monthly backup operations, and therefore only require that the data domain restorers are guaranteed to be available between 40% and 70% of the time. A third group of computing device users may only intend for backed up data to be stored periodically, and do not plan to access the data often, and therefore only require that the data domain restorers are guaranteed to the available between 10% and 40% of the time.

Such data domain restorers may fail from time to time. It is often possible to determine, based on an assessment of the data items associated with a given data domain restorer whether a data domain restorer has already failed. In one or more embodiments, it is also possible to assess a variety of data items related to a data domain restorer to determine that it is operating in a normal state, and thus likely not to fail within a certain time window, or that the data domain restorer may be likely to fail within said time window (e.g., five days), which, for example, may mean that the data items associated with the data domain restorer are similar to the data items associated with data domain restorers that previously failed within the time window.

In one or more embodiments, any machine learning algorithm may be provided a training data set that includes any number of data items associated with data domain restorers. Such a training data set may be used for the machine learning algorithm to predict a label (e.g., failed, normal, degraded and soon to fail, etc.) to be associated with a given data domain restorer. Such a prediction may be made, for example, by calculating a score based on the data items, and comparing the score to one or more threshold scores, with the outcome of the comparison(s) determining the label associated with a given data domain restorer.

In one or more embodiments, using enough information from the training data set, the machine learning algorithm advances its ability to correctly predict which label should be associated with a given data domain restorer.

However, in one or more embodiments, the prediction may or may not be correct, and the machine learning algorithm, does not provide any additional insight as to how likely the assigned label (e.g., failed or normal) is to being correct. Therefore, in one or more embodiments, additional analysis is performed to provide additional information that provides insight into the likelihood that the prediction is correct. Specifically, one or more embodiments described herein perform an additional analysis that includes comparisons of the prediction with sets of data that include previous predictions that a data domain restorer should have each of the labels in the label set. Such comparisons may be used to determine probabilities indicating how similar the current prediction is to the set of previous predictions using the data items associated with the current data domain restorer and the set of data domain restorers for which a label was predicted.

In one or more embodiments, such additional analysis to determine a set of probabilities may be referred to as a probability analysis. One example of such a probability analysis is a conformal prediction framework. Other probability classification schemes may be used without departing from the scope of embodiments described herein. In one or more embodiments, the probability analysis makes separate predictions that a given data domain restorer should be assigned each label in a label set (e.g., predict failed, then predict normal). Next, for each prediction, the information associated with the data domain restorer is compared with the set of previously predicted data domain restorer labels.

For example, a label of failed for a data domain restorer is predicted out of a set of labels including failed and normal. Next, the prediction is compared with a set of data domain restorers of the same type previously predicted to be failed, and a probability is assigned based on the comparison. Next, the prediction is compared to the set of data domain restorer predictions previously made that the label should be normal, and a probability is assigned based on the comparison. Next, a label of normal is predicted out of a set of labels including failed and normal. Next, the prediction is compared with a set of data domain restorers of the same type previously predicted to be failed, and a probability is assigned based on the comparison. Next, the prediction is compared to the set of data domain restorer predictions previously made that the label should be normal, and a probability is assigned based on the comparison. In one or more embodiments, the aforementioned analysis is used to assign a confidence value to the prediction made for a given data domain restorer.

In one or more embodiments, the set of data domain restorers that were predicted to be operating normally are ranked, with the data domain restorers having the highest confidence value being higher in the ranking.

Next, the set of data domain restorers in the ranked list are grouped according to the confidence values. For example, data domain restorers having a confidence value over a defined threshold may be placed in a best category, indicating that they are the best quality destinations to which to backup data from computing devices. One or more lower thresholds may also be defined to determine lower quality level destinations for backup data. The categorization of the data domain restorers may be used when placing backup data from computing devices based on the service level that is to be provided for such computing devices. In one or more embodiments, the ranking and grouping of data domain restorers is performed on an ongoing basis. For example, for each backup to be performed, or any subset thereof, a data domain restorer may be selected as a target based on a re-performance of the above-described analyses.

In one or more embodiments, once the aforementioned groupings have occurred, data backups computing devices are performed by backing up the data to a data domain restorer in a group that meets the service level to be provided for a given computing device.

In one or more embodiments, a backup to be performed to a data domain restorer within an appropriate group is performed to the highest ranked data domain restorer within the group that includes enough storage space to accommodate the data being backed up. In one or more embodiments, the highest ranked data domain restorer within the group is checked to determine if it has enough available storage to store the data. If it does, the data may be stored using that data domain restorer. If it does not, then subsequently lower ranked data domain restorers may be checked until a data domain restorer in the group is found, at which point the data is stored on that data domain restorer. In one or more embodiments, if there are no devices within the relevant group with enough space to store the backup data, then an alert is provided to an administrator of the data domain (e.g., a Dell EMC Data Domain).

Figure 1:
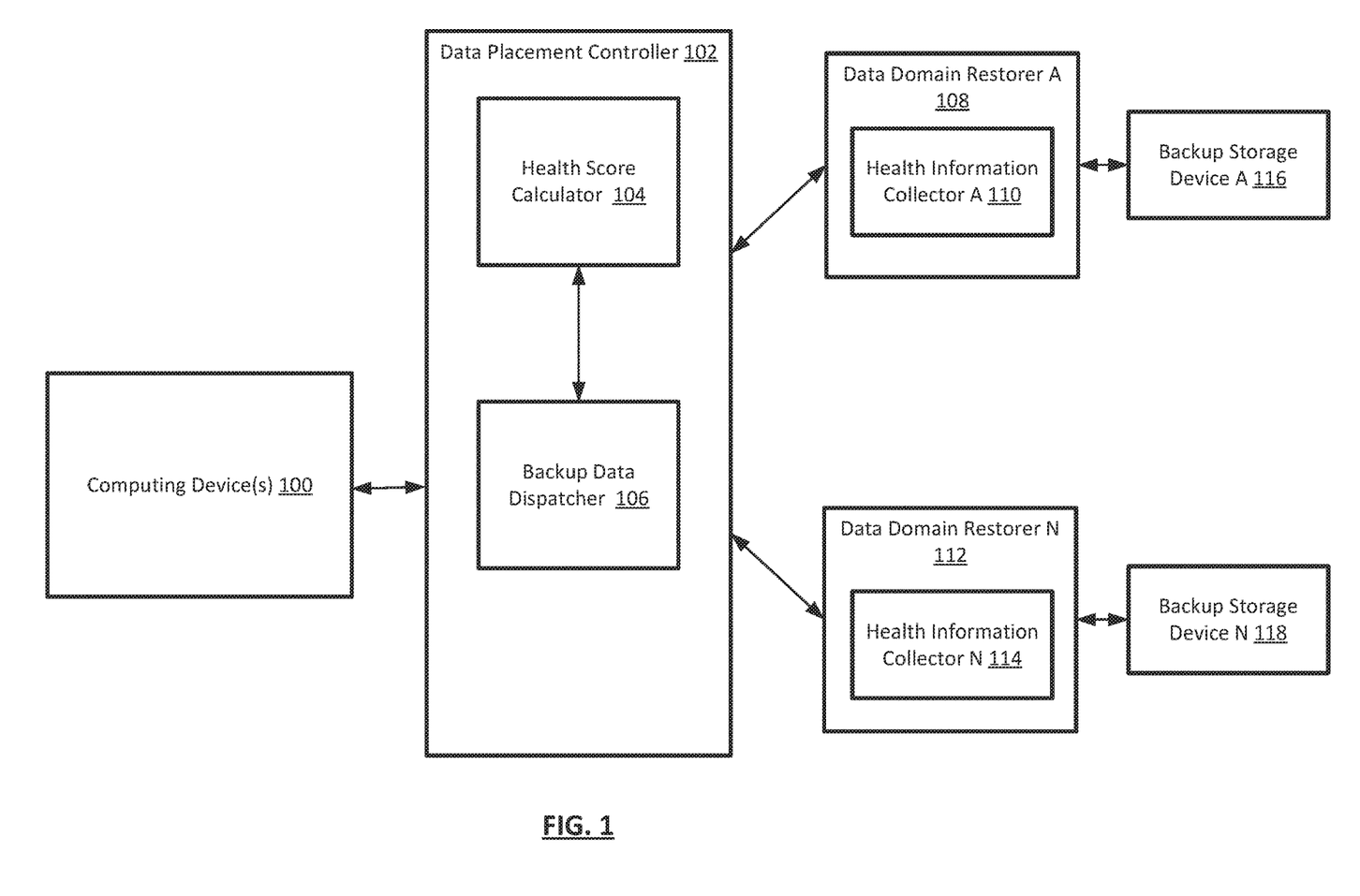
FIG. 1 shows a diagram of a system in accordance with one or more embodiments of the invention.

FIG. 1 shows a diagram of a system in accordance with one or more embodiments described herein. The system may include any number of computing devices (100). The system may also include a data placement controller (102). In one or more embodiments, the analyzer includes a health score calculator (104) and a backup data dispatcher (106). The system may also include any number of data domain restorers (e.g., data domain restorer A (108), data domain restorer N (112)). Each data domain restorer may include a health information collector (e.g., health information collector A (110), health information collector N (114)). Each data domain restorer (108, 112) may include and/or be operatively connected to any number of backup storage devices (e.g., backup storage device A (116), backup storage device N (118)). Each of these components is described below.

In one or more embodiments, a computing device (100) is any device or any set of devices capable of electronically processing instructions and may include, but is not limited to, any of the following: one or more processors (e.g., components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container for one or more applications), and/or any other type of computing device with the aforementioned requirements.

In one or more embodiments, any of all of the aforementioned examples may be combined to create a system of such devices. Other types of computing devices may be used without departing from the scope of the invention. In one or more embodiments, a set of computing devices (100) may form all or a portion of a data domain (e.g., a Dell EMC Data Domain). In one or more embodiments, a data domain is any set of computing devices (100) for which backup services are performed, such as, for example, data backup, disaster recovery, backup data deduplication, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a computing device (100) is operatively connected to a data placement controller (102). In one or more embodiments, a data placement controller (102) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a data placement controller (102) includes functionality to perform a predictive analysis using any machine learning algorithm Additionally, or alternatively, a data placement controller (102) may be provided the results of such a predictive analysis from any other component of the system (e.g., a data domain restorer (108, 112)). In one or more embodiments, the predictive analysis, as described above, provides a prediction relating to what label (e.g., failed or normal) should be associated with a given data domain restorer (108, 112).

In one or more embodiments, a data placement controller (102) includes a health score calculator (104). In one or more embodiments, a health score calculator (104) is any hardware (e.g., circuitry), software, firmware, or any combination thereof that includes functionality to perform an analysis to make or receive a prediction of a data domain restorer being failed or normal, and to assign a confidence value to such predictions. For example, a health score calculator (104) may be one or more processes executing on one or more processors of one or more computing devices. Data items used by a health score calculator (104) may include, but are not limited to: processor information, memory utilization information, cyclic redundancy check information, data error information, background media information, reallocated sector count information, disk start and stop information, disk power on information, temperature information, server temperature information, log file size information, various software versions information, BIOS information, packet drop information, latency information, connection status information, component card error information, etc.

In one or more embodiments, a health score calculator (104) includes functionality to obtain data items associated with any number of any number of data domain restorers (108, 112) and included or operatively connected backup storage devices (116, 118). In one or more embodiments, a health score calculator (104) further includes functionality to use the obtained data items to analyze the data items for a given data domain restorer (108, 112) against a set of previous predictions to determine a confidence value that each label in a set of labels is correct, and to use the health score results to determine which data from computing device (100) to backup using data domain restorers (108, 112) within a certain group of data domain restorers.

In one or more embodiments, a data placement controller (102) includes a backup data dispatcher (106). In one or more embodiments, a backup data dispatcher (106) is any hardware (e.g., circuitry), software, firmware, or any, combination thereof that includes functionality to transmit backup data to a backup storage device (116, 118) based on the analysis performed by a health information calculator (104).

In one or more embodiments, the data placement controller (102) is operatively connected to any number of data domain restorers (108, 112). In one or more embodiments, the data domain restorers (108, 1121) are also computing devices. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s)(not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a data domain restorer (108, 112) is a computing device that includes a variety of components used for managing, at least in part, backup and/or restoration of a data domain e.g., a set of computing devices (100)).

In one or more embodiments, the data domain restorer (108, 112) includes a health information collector (110, 114). In one or more embodiments, a health information collector (110, 114) is any hardware (e.g., circuitry), software, firmware, or any combination thereof that includes functionality to collect, record, and/or store information related to the health, based on certain data items, of a given data domain restorer and any included or operatively connected backup storage devices (1.16, 118). For example, a health information collector (110, 114) may be one or more processes executing on one or more processors of one or more computing devices.

In one or more embodiments, a backup storage device (116, 118) is any persistent storage device for storing data that is included in and/or operatively connected to a data domain restorer (108, 112).

While FIG. 1 shows a configuration of components, other configurations may be used without departing from the scope of embodiments described herein. Accordingly, embodiments disclosed herein should not be limited to the configuration of components shown in FIG. 1.

Figure 2:
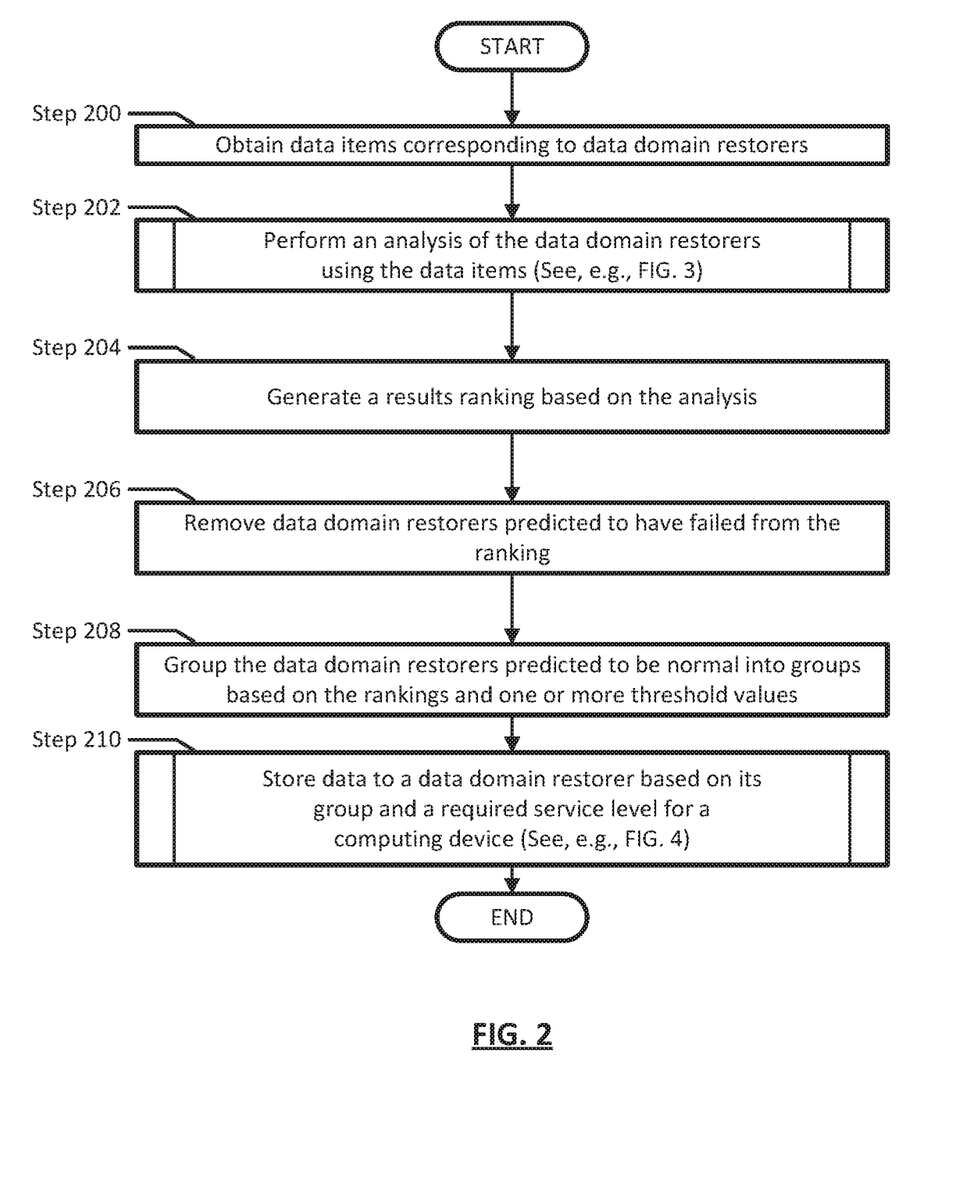
FIG. 2 shows a flowchart in accordance with one or more embodiments of the invention.

FIG. 2 shows a flowchart describing a method for placing backup data based on health scores of data domain restorers in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, data items associated with a data domain restorer are obtained. In one or more embodiments, any number of sets of such data items may be obtained, each associated with a respective data domain restorer. In one or more embodiments, the data items are obtained by one or more data placement controllers from one or more computing devices of one or more data domain restorers.

In Step 202, an analysis is performed using the data items obtained in Step 200. In one or more embodiments, in addition to the data items, a data placement controller also obtains predictions (e.g., using machine learning algorithm (s)) as to the state of the data domain restorers, which may be indicated using predicted assignment of labels (e.g., failed or normal) to respective data domain restorers. In other embodiments, the data placement controller performs the predictive analyses using the data items for each respective data domain restorer. In one or more embodiments, the analyses further include a conformal probability prediction associated with each predicted label assignment. Additional details of the additional analysis are discussed further in the description of FIG. 3, below.

In Step 204, a results ranking is generated based on the results of the probability prediction analysis. In one or more embodiments, for a given hardware component, the results ranking includes the results of the probability prediction analysis. In one or more embodiments, the results ranking is an organized data structure that includes the possible label set for a given hardware component, with each possible label associated with a probability that it matches, in any sense, with a set of data domain restorers previously assigned the given label.

In Step 206, any data domain restorer predicted to be failed is removed from the ranking, and an administrator may be alerted to the predicted failure.

In Step 208, the ranked list of Step 204, after removal of the predicted failures in Step 206, is grouped. A set of threshold values may be defined, and the groupings may be based on the threshold range in which the confidence level falls.

In Step 210, data from a computing device bay be backed up using a given data domain restorer based on the group to which the data domain restorer was assigned in Step 208 and a required service level associated with the computing device. After Step 210, the process may end.

Figure 3:
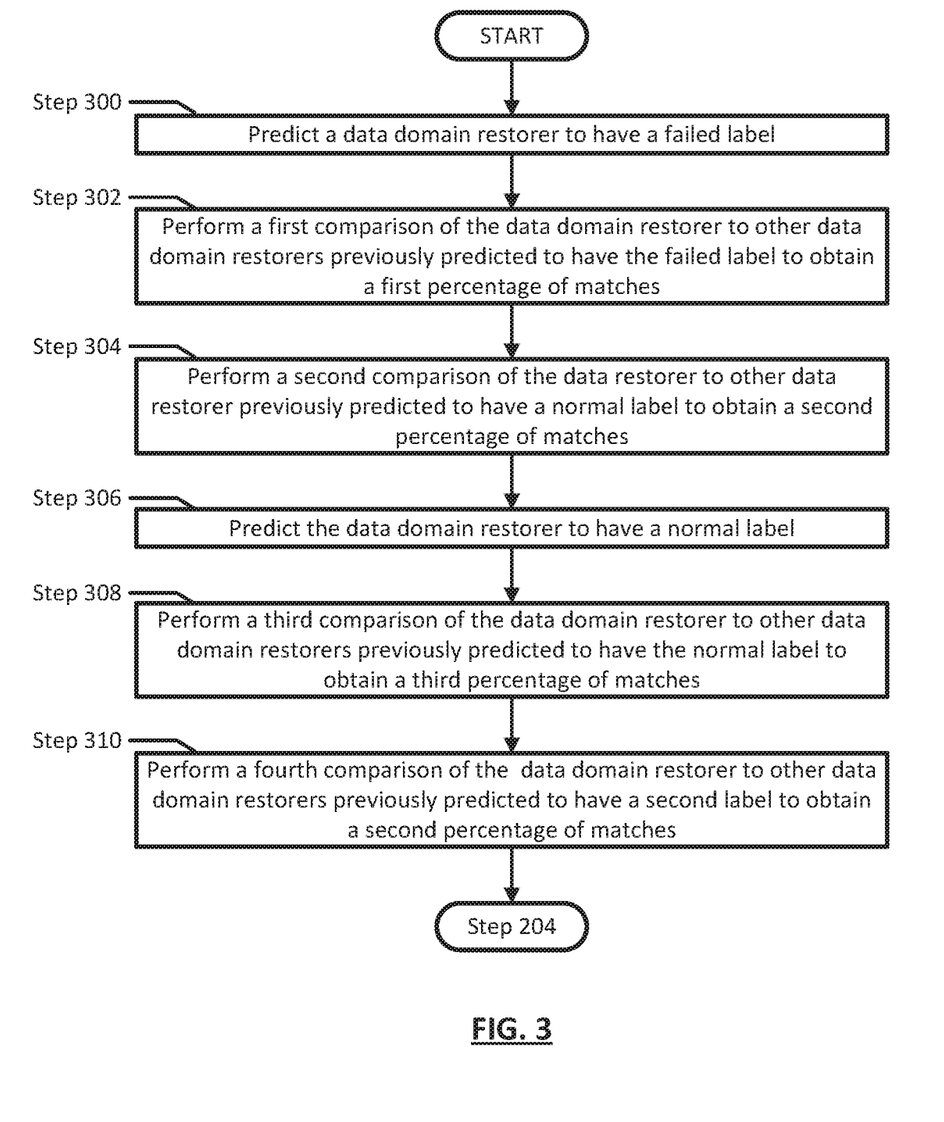
FIG. 3 shows a flowchart in accordance with one or more embodiments of the invention.

FIG. 3 shows a flowchart describing a method for placing backup data based on health scores in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, a prediction is made that a given hardware component should be assigned a first label (e.g., failed or soon to fail).

In Step 302, the prediction made in Step 300 is tested, at least in part. In one or more embodiments, the portion of the test of the prediction made in Step 300 includes comparing the prediction to a set of hardware components of the same type that were previously predicted to have the predicted label. For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm) In one or more embodiments, the results of the comparison yield a first probability representing the level of match between the current prediction and the set of hardware components of the same type that were previously predicted to have the predicted label.

In Step 304, the prediction made in Step 300 is tested again, at least in part. In one or more embodiments, the additional portion of the test of the prediction made in Step 300 includes comparing the prediction to a set of hardware components of the same type that were previously predicted to have a label different from the predicted label (e.g., normal instead of the predicted failed or soon to be failed label). For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm). In one or more embodiments, the results of the comparison yield a second probability representing the level of match between the current prediction and the set of hardware components of the same type that were previously predicted to have a label other than the predicted label.

In Step 306, a prediction is made that a given hardware component should be assigned a second label that is different from the first label (e.g., normal instead of failed).

In Step 308, the prediction made in Step 306 is tested, at least in part. In one or more embodiments, the portion of the test of the prediction made in Step 306 includes comparing the prediction to a set of hardware components of the same type that were previously predicted to have a label other than the predicted label (e.g., the predicted label is normal, and the comparison is to hardware components predicted to have a failed label). For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar ((e.g., using the aforementioned nearest neighbor algorithm). In one or more embodiments, the results of the comparison yield a third probability representing the level of match between the current prediction and the set of hardware components of the same type that were previously predicted to have the label that is different than the predicted label of Step 306.

In Step 310, the prediction made in Step 306 is tested again, at least in part. In one or more embodiments, the additional portion of the test of the prediction made in Step 306 includes comparing the prediction to a set of hardware components of the same type that were previously predicted to have the predicted label of Step 306. For example, a nearest neighbor analysis may be performed that calculates that fraction of examples in the set of previously predicted hardware components to which the currently-being-analyzed hardware component would be considered a nearest neighbor. In one or more embodiments, the analysis includes creating a taxonomy used to group examples that are sufficiently similar (e.g., using the aforementioned nearest neighbor algorithm) In one or more embodiments, the results of the comparison yield a fourth probability representing the level of match between the current prediction and the set of hardware components of the same type that were previously predicted to have the predicted label.

In one or more embodiments, after Step 310, the process returns to Step 204 of FIG. 2.

In one or more embodiments, the additional analysis set forth in FIG. 2 and FIG. 3, as discussed above, is used to determine a set of conformal confidence predictions, and may be referred to as a probability analysis. Other probability classification schemes may be used without departing from the scope of embodiments described herein. In one or more embodiments, the probability analysis makes separate predictions that a given data domain restorer should be assigned each label in a label set e.g., predict failed, then predict normal). Next, for each prediction, the information associated with the data domain restorer is compared with the set of previously predicted data domain restorer labels.

For example, a label of failed for a data domain restorer is predicted out of a set of labels including failed and normal. Next, the prediction is compared with a set of data domain restorers of the same type previously predicted to be failed, and a confidence level is assigned based on the comparison. Next, the prediction is compared to the set of data domain restorer predictions previously made that the label should be normal, and a confidence value is assigned based on the comparison. Next, a label of normal is predicted out of a set of labels including failed and normal. Next, the prediction is compared with a set of data domain restorers of the same type previously predicted to be failed, and a confidence value is assigned based on the comparison. Next, the prediction is compared to the set of data domain restorer predictions previously made that the label should be normal, and a confidence is assigned based on the comparison.

Figure 4:
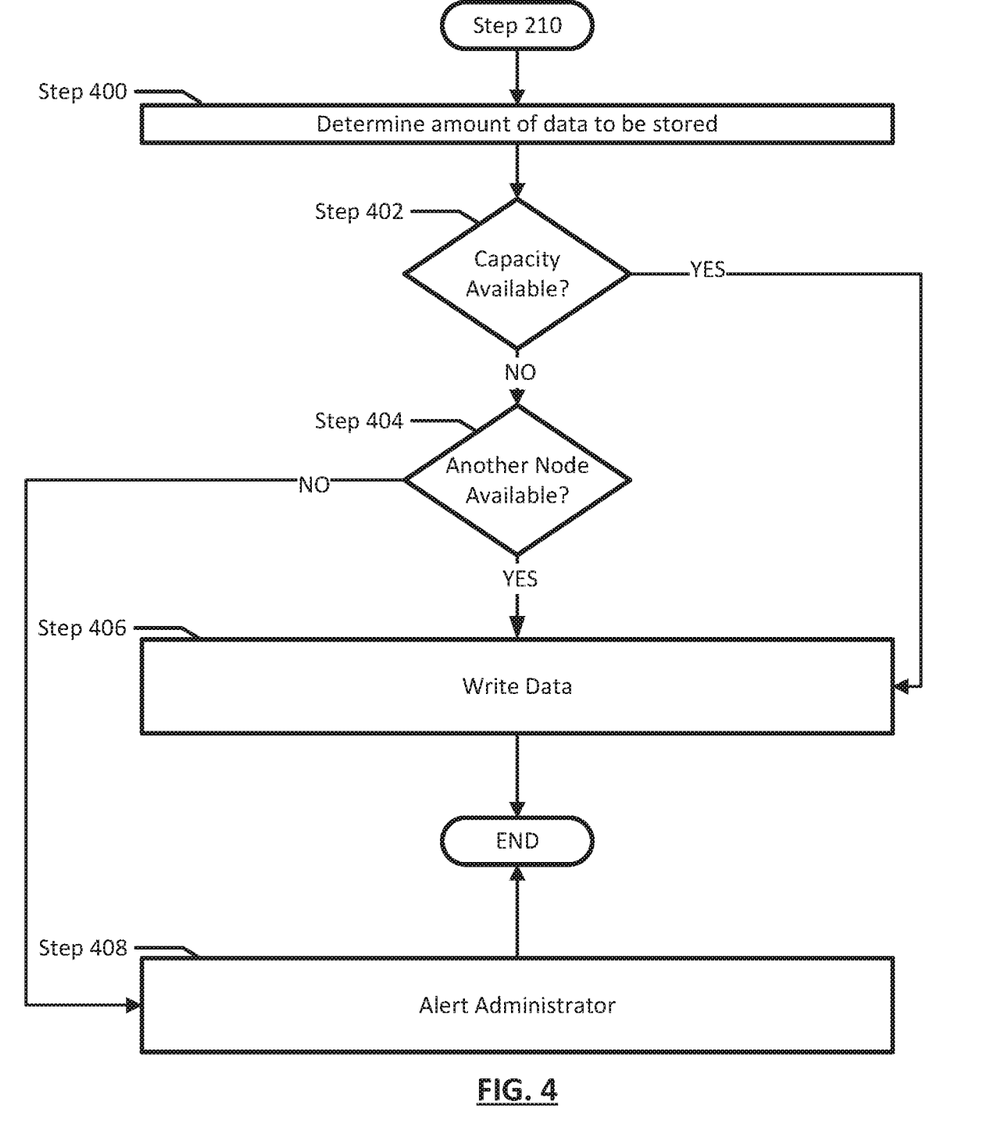
FIG. 4 shows a flowchart in accordance with one or more embodiments of the invention.

FIG. 4 shows a flowchart describing a method for determining, within a given group of data domain restorers, whether data may be stored to a given data domain restorer.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 400, a determination is made as to the amount of data that is to be backed up. For example, a determination may be made that 33 gigabytes are to be backed up from a computing device to backup storage operatively connected to a given data domain restorer in a given group of data domain restorers.

In Step 402, a determination is made as to whether a data domain restorer with the highest confidence value in a given group of data domain restorers has enough storage capacity to store the data. In one or more embodiments, if there is enough capacity, the method proceeds to Step 406. In one or more embodiments, if there is not enough capacity, the method proceeds to Step 404.

In Step 404, a determination is made as to whether another data domain restorer with the next highest confidence value in a given group of data domain restorers has enough storage capacity to store the data. In one or more embodiments, if there is enough capacity, the method proceeds to Step 406. In one or more embodiments, if there is not enough capacity, the method proceeds to Step 408.

In Step 406, after determining that a data domain restorer in a given group of data domain restorers has enough capacity to store the data to be backed up, the data is written to the relevant backup storage.

In Step 408, if a determination is made that no data domain restorer e.g., a node) in a given group of data domain restorers has enough storage capacity to store the necessary amount of data for the intended backup, an alert is sent to an administrator. After either Step 406 or Step 408, the method ends.

Figure 5:
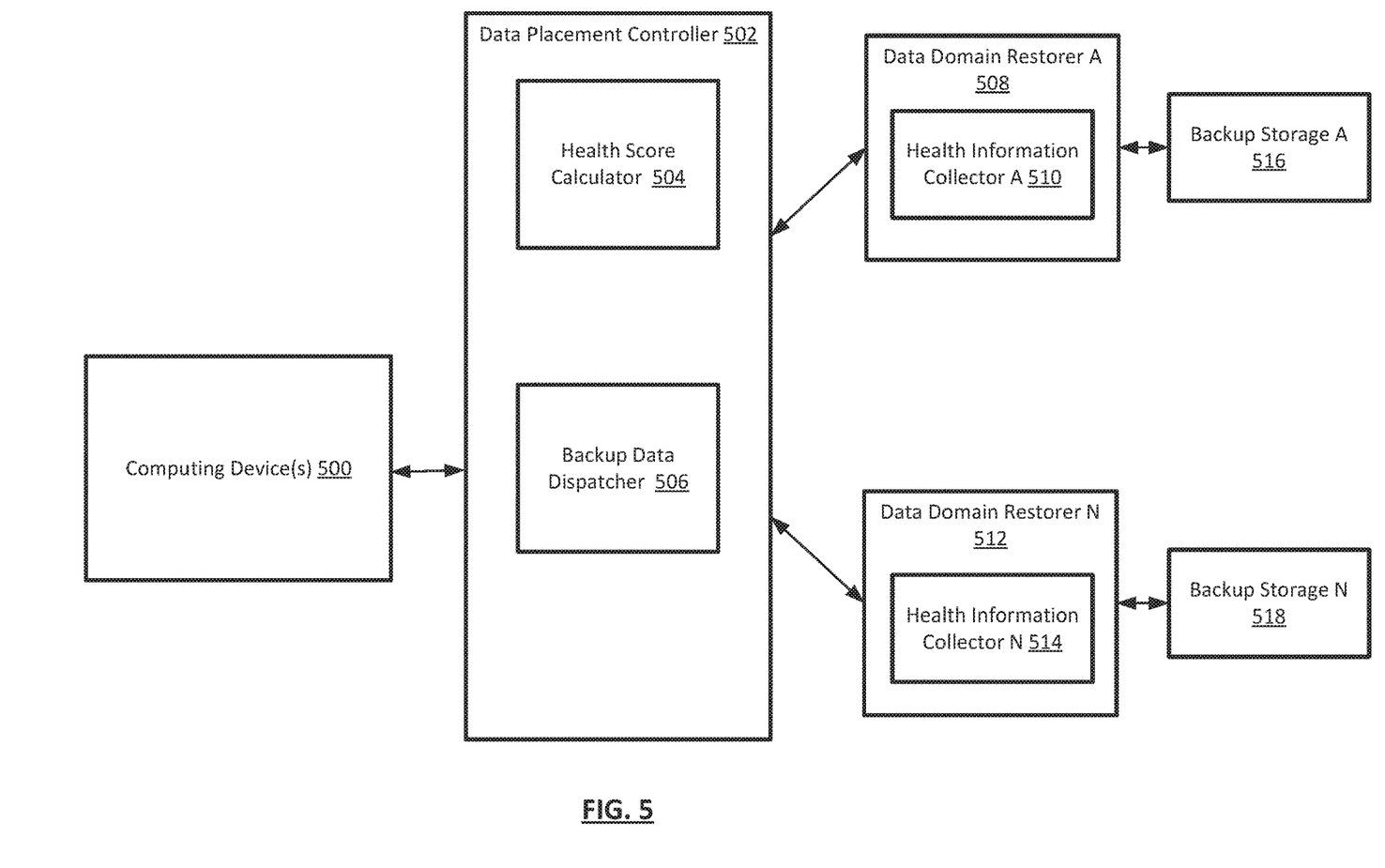
FIG. 5 shows an example in accordance with one or more embodiments of the invention.

FIG. 5 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 5, consider a scenario in which a set of computing devices (500) within a data domain have data to be backed up. In such a scenario, each computing device of the computing devices (500) is operatively connected to a data placement controller (502), which includes a health score calculator (504) and a backup data dispatcher (506). Also, the data placement controller (502) is operatively connected to at least two data domain restorers (508, 502), each of which is operatively connected to a backup storage device (516, 518) and includes a health information collector (510, 514).

In the aforementioned scenario, the data placement controller periodically obtains data items associated with the various data domain restorers, makes a prediction as to whether they are or are not failed, and for those not predicted to be failed, assigns a confidence level to the prediction.

In one or more embodiments, the data placement controller then ranks the data domain restorers based on the assigned confidence levels. In one or more embodiments, the data placement controller then groups the ranked data placement controllers based on the confidence levels falling within defined threshold ranges.

For example, data domain restorer A (508) may be predicted to be operating normally and have a confidence value of 95%, which causes it to be placed into a first group to be used for high-priority backup jobs. Data domain restorer B (510) may be predicted to be operating normally and have a confidence value of 65%, which causes it to be placed into a second group to be used for lower-priority backup jobs.

Figure 6:
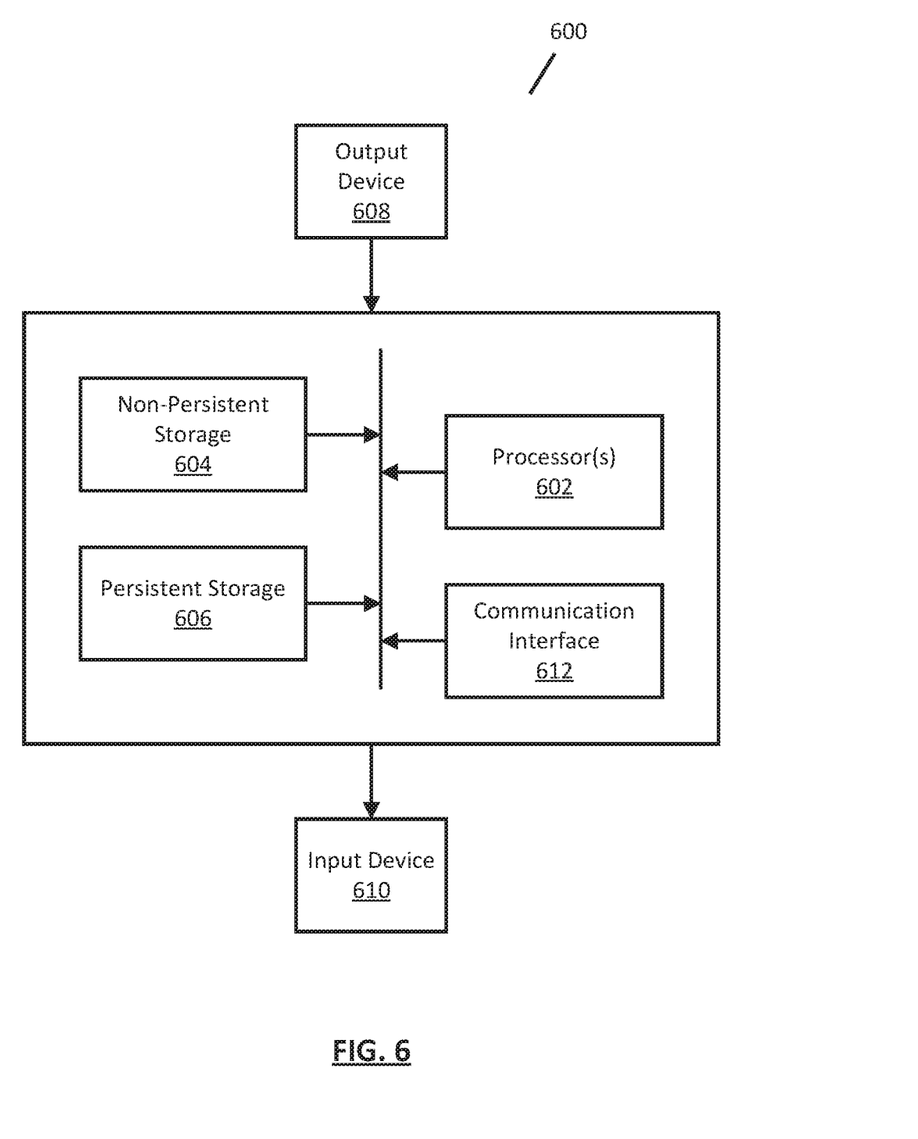
FIG. 6 shows a computing system in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (508), and numerous other elements (not shown) and functionalities. Each of these components is described below. 100911 in one embodiment of the invention, the computer processor(s) (602) may be an integrated circuit for processing instructions. For example, the computer processor(s) may be one or more cores or micro-cores of a processor. The computing device (500) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touch screen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for placing backup data based on health scores, the method comprising:
    obtaining a first plurality of data items associated with a first data domain restorer;
    obtaining a second plurality of data items associated with a second data domain restorer;
    making a first prediction that the first data domain restorer is operating normally;
    making a second prediction that the second data domain restorer is operating normally;
    assigning a first confidence value to the first prediction;
    making a first classification of the first data domain restorer in a first group based on the first confidence value;

assigning a second confidence value to the second prediction;
making a second classification of the second data domain restorer in a second group based on the second confidence value; and
performing a first data backup to the first data domain restorer from a first computing device based on the first classification and a first service level required for the first computing device.

2. The method of claim 1, further comprising:
performing a second data backup to the second data domain restorer from a second computing device based on the second classification and a second service level required for the second computing device.

3. The method of claim 1, further comprising:
obtaining a third plurality of data items associated with a third data domain restorer;
making a third prediction that the first data domain restorer is failed; and
removing, based on the third prediction, the third data domain restorer from a set of data domain restorers to be used for data backups.

4. The method of claim 1, wherein the first confidence value and the second confidence value are part of a set of confidence values in a ranked list of confidence values.

5. The method of claim 1, wherein the first data domain restorer and the second data domain restorer are part of a deduplication cluster.

6. The method of claim 1, wherein the first prediction and the second prediction are made using a machine learning algorithm.

7. The method of claim 6, wherein the machine learning algorithm is a nearest neighbor algorithm.

8. The method of claim 1, wherein assigning the first confidence value comprises performing a conformal prediction analysis.

9. The method of claim 8, wherein performing a conformal prediction analysis comprises:
assigning a failed label to the first data domain restorer;
performing a first comparison of the failed label using the first plurality of data items and a plurality of other data items for a plurality of other data domain restorers previously predicted to have failed labels to obtain a first non-conformity value;
assigning a normal label to the first data domain restorer; and
performing a second comparison of the normal label using the first plurality of data items and the plurality of other data items for the plurality of other data domain restorers previously predicted to have normal labels to obtain a second non-conformity value,
wherein the first confidence value is based on the second non-conformity value.

10. The method of claim 1, wherein the first group comprises a first plurality of data domain restorers with confidence values above a threshold value and the second group comprises a second plurality of data domain restorers with confidence values below the threshold value.

11. The method of claim 10, wherein the threshold value is associated with a predicted amount of down time.

12. A non-transitory computer readable medium comprising computer readable program code, which when executed by a computer processor enables the computer processor to perform a method for placing backup data based on health scores, the method comprising:
obtaining a first plurality of data items associated with a first data domain restorer;
obtaining a second plurality of data items associated with a second data domain restorer;
making a first prediction that the first data domain restorer is operating normally;
making a second prediction that the second data domain restorer is operating normally;
assigning a first confidence value to the first prediction;
making a first classification of the first data domain restorer in a first group based on the first confidence value;
assigning a second confidence value to the second prediction;
making a second classification of the second data domain restorer in a second group based on the second confidence value; and
performing a first data backup to the first data domain restorer from a first computing device based on the first classification and a first service level required for the first computing device.

13. The non-transitory computer readable medium of claim 12, wherein the method further comprises:
performing a second data backup to the second data domain restorer from a second computing device based on the second classification and a second service level required for the second computing device.

14. The non-transitory computer readable medium of claim 12, wherein assigning the first confidence value comprises performing a conformal prediction analysis comprising:
assigning a failed label to the first data domain restorer;
performing a first comparison of the failed label using the first plurality of data items and a plurality of other data items for a plurality of other data domain restorers previously predicted to have failed labels to obtain a first non-conformity value;
assigning a normal label to the first data domain restorer; and
performing a second comparison of the normal label using the first plurality of data items and the plurality of other data items for the plurality of other data domain restorers previously predicted to have normal labels to obtain a second non-conformity value,
wherein the first confidence value is based on the second non-conformity value.

15. The non-transitory computer readable medium of claim 12, further comprising:
obtaining a third plurality of data items associated with a third data domain restorer;
making a third prediction that the first data domain restorer is failed; and
removing, based on the third prediction, the third data domain restorer from a set of data domain restorers to be used for data backups.

16. The non-transitory computer readable medium of claim 12, wherein the first prediction and the second prediction are made using a machine learning algorithm.

17. The non-transitory computer readable medium of claim 16, wherein the machine learning algorithm is a nearest neighbor algorithm.

18. The non-transitory computer readable medium of claim 12, wherein the first group comprises a first plurality of data domain restorers with confidence values above a threshold value and the second group comprises a second plurality of data domain restorers with confidence values below the threshold value.

19. The non-transitory computer readable medium of claim 18, wherein the threshold value is associated with a predicted amount of down time.

20. A system for placing backup data based on health scores, the system comprising:
- a first data domain restorer comprising a first processor, first memory, and a first persistent storage device;
- a second data domain restorer comprising a second processor, second memory, and a second persistent storage device; and
- a data placement controller comprising a third processor, third memory, and a third persistent storage device, and configured to:
  - obtain a first plurality of data items associated with the first data domain restorer;
  - obtain a second plurality of data items associated with the second data domain restorer;
  - make a first prediction that the first data domain restorer is operating normally;
  - make a second prediction that the second data domain restorer is operating normally;
  - assign a first confidence value to the first prediction;
  - make a first classification of the first data domain restorer in a first group based on the first confidence value;
  - assign a second confidence value to the second prediction;
  - make a second classification of the second data domain restorer in a second group based on the second confidence value; and
  - perform a first data backup to the first data domain restorer from a first computing device based on the first classification and a first service level required for the first computing device.

* * * * *